United States Patent
Yang et al.

(10) Patent No.: US 8,934,669 B2
(45) Date of Patent: Jan. 13, 2015

(54) SELF-ADAPTIVE IMAGE-BASED OBSTACLE DETECTION METHOD

(75) Inventors: Chih-Hung Yang, Changhua County (TW); Li-You Hsu, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 368 days.

(21) Appl. No.: 13/568,824

(22) Filed: Aug. 7, 2012

(65) Prior Publication Data

US 2013/0329945 A1 Dec. 12, 2013

(30) Foreign Application Priority Data

Jun. 8, 2012 (TW) .............................. 101120709 A

(51) Int. Cl.
| | | |
|---|---|---|
| G06K 9/00 | (2006.01) |
| G06K 9/34 | (2006.01) |
| G06K 9/46 | (2006.01) |
| G06K 9/66 | (2006.01) |
| G06K 9/36 | (2006.01) |
| G06K 9/20 | (2006.01) |

(52) U.S. Cl.
USPC ........... 382/103; 382/104; 382/164; 382/165; 382/190; 382/237; 382/282

(58) Field of Classification Search
None
See application file for complete search history.

(56) References Cited

U.S. PATENT DOCUMENTS 6,937,761 B2 * 8/2005 Thomas et al. ............... 382/173
7,346,191 B2    3/2008 Sano

FOREIGN PATENT DOCUMENTS

TW    I327536    7/2010

OTHER PUBLICATIONS

Soquet et al., "Road Segmentation Supervised by an Extended V-Disparity Algorithm for Autonomous Navigation", 2007 IEEE Intelligent Vehicles Symposium, 2007, pp. 160-165.*

* cited by examiner

*Primary Examiner* — Matthew Bella
*Assistant Examiner* — Jose M Torres
(74) *Attorney, Agent, or Firm* — Muncy, Geissler, Olds & Lowe, P.C.

(57) ABSTRACT

A self-adaptive image-based obstacle detection method comprises steps: capturing an original image; transforming the original image to an HSV color space, and retrieving a hue component (H) and a saturation component (S) of the HSV color space to form an HS-based image; dividing the HS-based image into image blocks; selecting one image block as a background block; using an obstacle recognition equation to determine whether each of the image blocks is similar to the background block; if no, deleting the image block; if yes, preserving the image block to form a binary obstacle image; and overlaying the binary obstacle image on the original image to filter out the background and obtain an initial ambit of an obstacle image. Then, three orderly movement flow equations are used to determine whether it is an obstacle.

11 Claims, 5 Drawing Sheets

A

SELF-ADAPTIVE IMAGE-BASED OBSTACLE DETECTION METHOD

BACKGROUND OF THE INVENTION

1. Field of the Invention

The present invention relates to a technology to detect static or moving obstacle, particularly to a self-adaptive image-based obstacle detection method that filters out the background to obtain the position of an obstacle.

2. Description of the Related Art

Most conventional image-based obstacle detection methods use the edge detection technology or the image flow technology to detect the region of a moving object, and then use a mathematical morphological method to find possible positions of the object, and then use a shape matching technology to search in different regions to determine which one is an obstacle or a moving obstacle. The discrimination ability depends on the adaptability of the templates. If the templates are insufficient, probability of error increases, and the search time is prolonged. Some conventional image-based obstacle detection methods calculate the image eigenvalues of the possible moving objects in an image and construct a logic mechanism to determine whether one possible moving object is a real moving object. However, the conventional technology is time-consuming and hard to implant into an embedded system.

A Taiwan patent No. I327536 disclosed an edge-based obstacle detection method, which comprises steps: capturing a plurality of original images; extracting edges from the original images to generate edge objects and the information corresponding to each edge object; regulating the focus length of the camera and the horizontal distance according to the information of the edge objects; generating the relative distance of each edge object; comparing the relative distance of each edge object with a threshold distance; determining an edge object to be an obstacle if its relative distance is less than the threshold distance. However, the discrimination ability of the prior art depends on the adaptability of the templates. If the templates are insufficient, the probability of error increases, and the search time is prolonged.

A U.S. Pat. No. 7,346,191 disclosed an image flow-based obstacle detection method, which converts the image flows of the captured obstacle images into histograms to find out obstacles. The prior art is also an obstacle detection method. However, it is distinct from the abovementioned methods that compare the background with the image of the possible obstacle to find out a moving obstacle. The prior art needs complicated computation and thus has poor efficiency.

Accordingly, the present invention proposes a self-adaptive image-based obstacle detection method to solve the above-mentioned problems.

SUMMARY OF THE INVENTION

The primary objective of the present invention is to provide a self-adaptive image-based obstacle detection method, which performs color space conversion and image division to accelerate computation and enhance the anti-noise ability, and which filters the background and preserves the obstacle region or the moving obstacle region.

Another objective of the present invention is to provide a self-adaptive image-based obstacle detection method, which can capture images from any scene and any visual field, and which generates a warning message to remind the driver that his vehicle is approaching an obstacle or a moving obstacle.

A further objective of the present invention is to provide a self-adaptive image-based obstacle detection method, which can detect an obstacle or a moving obstacle, merely using simple statistics and calculation, and which is adapted to various embedded systems.

To achieve the abovementioned objectives, the present invention proposes a self-adaptive image-based obstacle detection method, which comprises steps: capturing an original image; transforming the original image to an HSV (Hue-Saturation-Value) color space, and retrieving a hue component (H) and a saturation component (S) of the HSV color space to form an HS-based image; dividing the HS-based image into a plurality of image blocks; selecting one of the image blocks as a background block; according to an obstacle recognition equation, determining whether each of the image blocks in the HS-based image is similar to the background block; if the image block is dissimilar to the background block, deleting the image block; if the image block is similar to the background block, preserving the image block to obtain an initial ambit of an obstacle image. Then, three orderly movement flow equations are used to determine whether it is an obstacle.

Below, embodiments are described in detail to make easily understood the objectives, technical contents, characteristics and accomplishments.

DETAILED DESCRIPTION OF THE INVENTION

Figure 1:
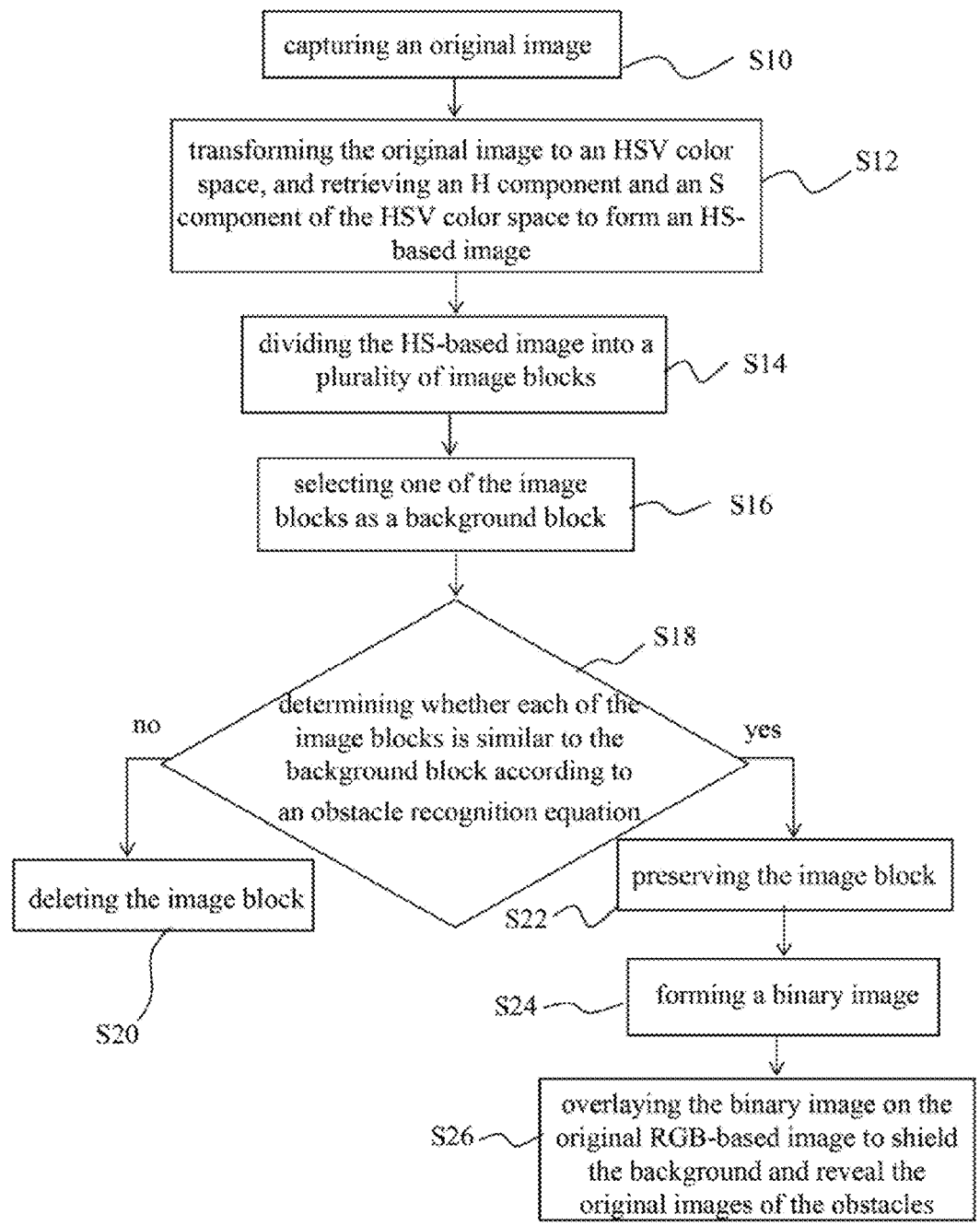
FIG. 1 shows a flowchart of a self-adaptive image-based obstacle detection method according to one embodiment of the present invention.
Figure 2A:
FIGS. 2A-2F illustrate the steps of a self-adaptive image-based obstacle detection method according to one embodiment of the present invention.
Figure 2B:
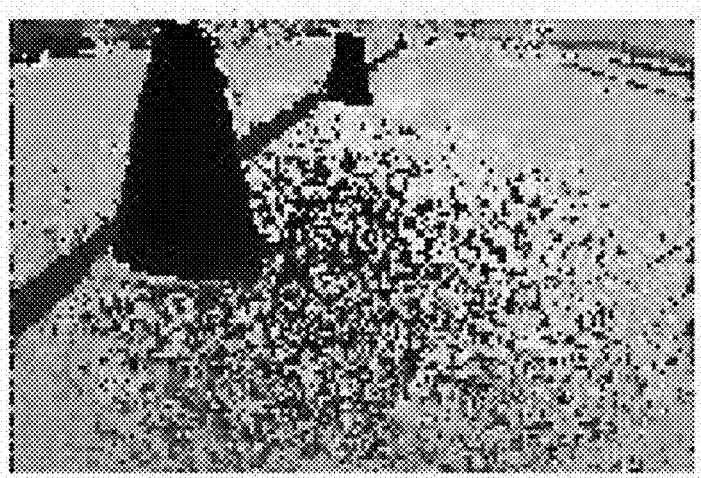
Figure 2C:
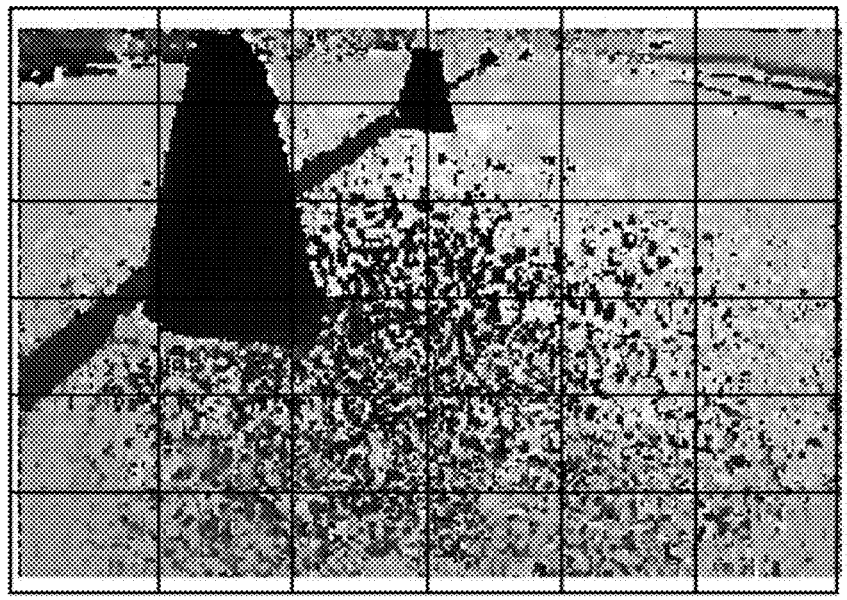
Figure 2D:
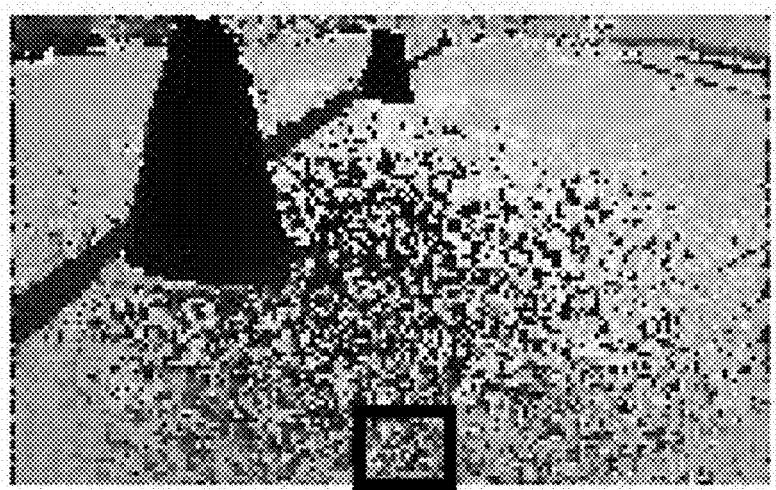
Figure 2E:
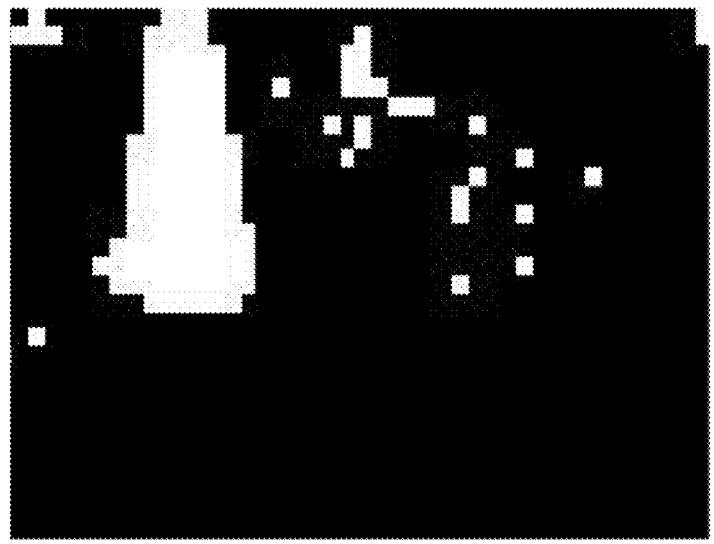
Figure 2F:

The present invention pertains to a self-adaptive image-based obstacle detection method. Refer to FIG. 1 and FIGS. 2A-2F. In Step S10, firstly capture an original image based on the commonly-used RGB color space, as shown in FIG. 2A. Next, in Step S12, transform the RGB-based original image to a HSV color space, and retrieve an image based on two components of the HSV color space—hue (H) and saturation (S), as shown in FIG. 2B. Next, in Step S14, divide the HS-based image into a plurality of image blocks each containing N×N pixels. In one embodiment, the HS-based image has 720×480 pixels, i.e. 345600 pixels. If the computation is executed pixel by pixel, the information load would be very high, and the sensitivity to noise is also increased. In order to increase computation efficiency and decrease the sensitivity to noise, this embodiment divides the HS-based image into image blocks each containing 16×16 pixels. Next, in Step S16, select an image block from the plurality of image blocks to function as a background block A, as shown in FIG. 2D. In one embodiment, the middle image block in the bottom of the HS-based image is selected as the background block A. Next, in Step S18, determine whether an image block of the HS-based image is similar to the background block according to an obstacle recognition equation expressed by $$R_{i,j} = P((H\_A_i - H\_A_j)^2 + (S\_A_i - S\_A_j)^2) + (1-P)((H\_S_i - H\_S_j)^2 + (S\_S_i - S\_S_j)^2) \qquad (1)$$

wherein $R_{i,j}$ is a threshold value, P a parameter, $H\_A_i$ the average of the H value of the background block, $H\_S_i$ the standard deviation of the H value of the background block, $S\_A_i$ the average of the S value of the background block, $S\_S_i$ the standard deviation of the S value of the background block, $H\_A_j$ the average of the H value of the image block, $H\_S_j$ the standard deviation of the H value of the image block, $S\_A_j$ the average of the S value of the image block, and $S\_S_j$ the standard deviation of the S value of the image block. If the image block is dissimilar to the background block, the process proceeds to Step S20 to delete the image block. If the image block is similar to the background block, the process proceeds to Step S22 to preserve the image block. Then, the process proceeds to Step S24 to form a binary image and recover the binary image to have 720×480 pixels, as shown in FIG. 2E. Finally, the process proceeds to Step S26 to overlay the binary image on the original RGB-based image to shield the background and reveal the original images of the obstacles. Thus is defined the initial ambits of the obstacle images.

After obtaining the initial ambits of obstacle images, the present invention can further apply to a vehicular approaching-obstacle detection method, which is used in a vehicle and has a preset distance. If the distance between the vehicle and an obstacle is less than the preset distance, a warning message is generated to remind the driver that the vehicle has been too close to the obstacle.

Figure 3:
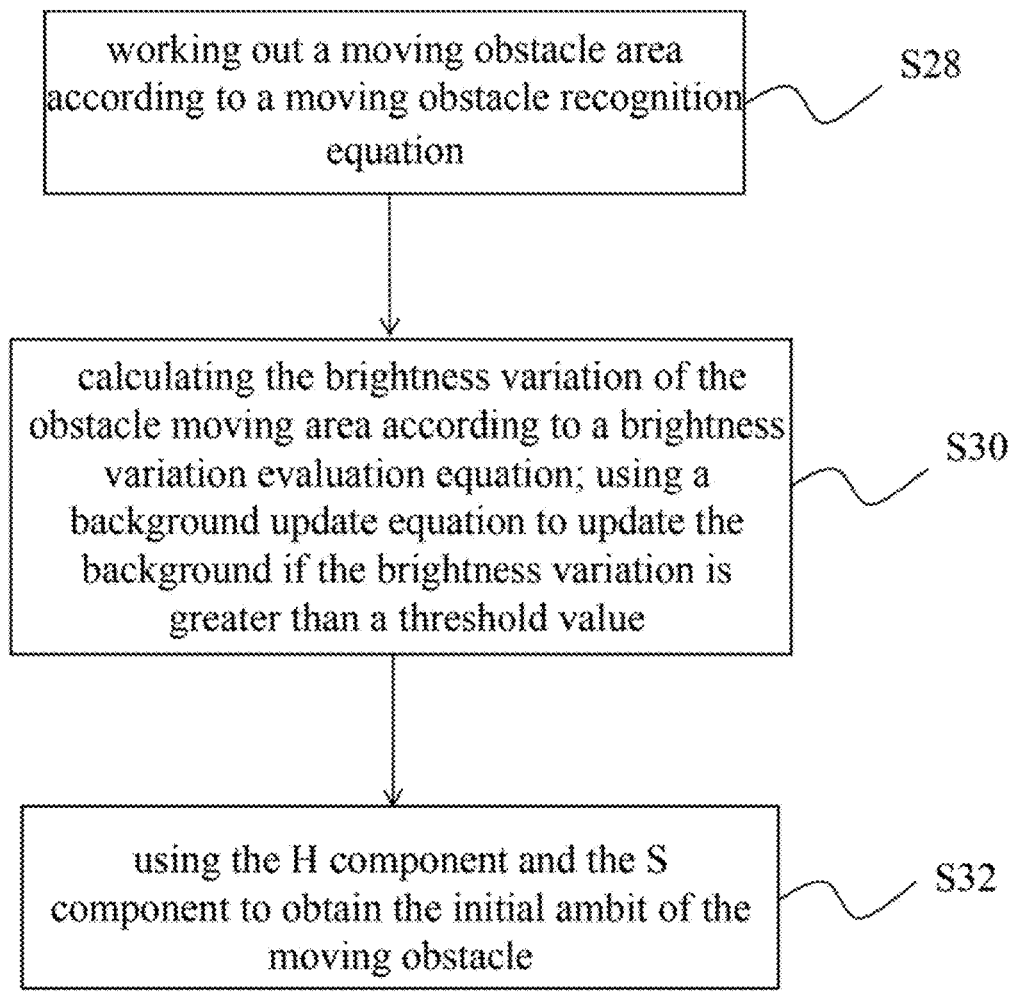
FIG. 3 shows a flowchart of a self-adaptive image-based method for detecting a moving obstacle according to one embodiment of the present invention.

After Steps S10-S26, the process may further proceeds to Steps S28-S32. If the process is intended to proceed to Steps S28-S32, the binary image is not recovered to have 720×480 pixels so that Step S28 can succeed to Step S24. Refer to FIG. 3. In Step S28, work out the area where an obstacle is moving in the HS-based image according to a moving obstacle recognition equation expressed by $$a_n = \text{boolean}(\text{Norm}(P_n(u,v) - A_n(u,v)) > \delta) \quad (2)$$

wherein $a_n$ is the area where an obstacle is moving, $P_n$ the current image, $A_n$ the current background image, $\delta$ a threshold value, and n the serial number of the image. Next, in Step S30, calculate the brightness variation of the obstacle moving area according to a brightness variation evaluation equation expressed by $$N_{n+1} = \text{boolean}((\text{Norm}(P_n(u,v) - P_{n-1}(u,v)) > \sigma) \cap (\text{Norm}(P_n(u,v) - P_{n-2}(u,v)) > \sigma)) \quad (3)$$

wherein $N_n$ is the area where brightness varies, $P_n$ the current image, $\delta$ a brightness threshold value, and n the serial number of the image. If the brightness variation evaluation equation (3) is satisfied, update the background with a background update equation expressed by $$\text{if } N_n(u,v) = 0, A_{n+1}(u,v) = \alpha A_n(u,v) + (1-\alpha) P_n(u,v)$$

else $$A_{n+1}(u,v) = A_n(u,v) \quad (4)$$

wherein $N_n$ is the area where brightness varies, $P_n$ the current image, $A_n$ the current background image, n the serial number of the image, $\alpha$ a constant between 0 and 1. From the background update equation (4), it is known that the background update equation (4) would not update the background unless boolean(Norm($P_n(u,v) - P_{n-1}(u,v)$)>σ) and boolean(Norm($P_n(u,v) - P_{n-2}(u,v)$)>σ) are simultaneously greater than the preset brightness threshold value. As long as one of them is smaller than the brightness threshold value, the background would not be updated. Updating the background can detect a moving obstacle, and this technology applies to image systems of different visual fields. Then, in Step S32, use the H (hue) component and S (saturation) component to encircle the region of the moving obstacle, and filter out the noise to obtain the initial ambit of the moving obstacle. In calculating the ambit of the moving obstacle, the image is also divided into N×N image blocks to reduce computation load, increase computation speed and decrease the sensitivity to noise. In one embodiment, the image is divided into image blocks each containing 16×16 pixels. After the computation is completed, the image blocks are recovered into an image having 720×480 pixels.

After detecting moving obstacle images, the information can further apply to a vehicular approaching-obstacle detection method, which is used in a vehicle and has a preset distance. If the distance between the vehicle and a moving obstacle is less than the preset distance, a warning message is generated to remind the driver that the vehicle has been too close to the obstacle.

In conclusion, the present invention performs color space conversion and image division to accelerate computation and enhance the anti-noise ability. The present invention filters out the background and preserves the regions of obstacles or moving obstacles. The present invention can apply to any scene and any visual field to detect obstacles or moving obstacles and warn the user of the obstacles. The present invention can detect obstacles and moving obstacles, merely using simple statistics and calculation. Further, the present invention is adapted to various embedded systems.

The embodiments described above are only to exemplify the present invention but not to limit the scope of the present invention. Any equivalent modification or variation according to the spirit of the present invention is to be also included within the scope of the present invention.

What is claimed is:

1. A self-adaptive image-based obstacle detection method, comprising steps:
    capturing an original image;
    transforming said original image to an HSV (Hue-Saturation-Value) color space, and retrieving a hue component (H) and a saturation component (S) of said HSV color space to form an HS-based image;
    dividing said HS-based image into a plurality of image blocks;
    selecting one of said image blocks as a background block;
    according to an obstacle recognition equation, determining whether each of said image blocks in said HS-based image is similar to said background block; if said image block is dissimilar to said background block, deleting said image block; if said image block is similar to said background block, preserving said image block to form a binary obstacle image; and
    overlaying said binary obstacle image on said original image to filter out a background and obtain an initial ambit of an obstacle image.

2. The self-adaptive image-based obstacle detection method according to claim 1 further comprising steps:
    calculating a moving obstacle region in said HS-based image according to a moving obstacle recognition equation;
    determining a brightness variation of said moving obstacle region according to a brightness variation evaluation equation; if said brightness variation is greater than a brightness threshold, updating a background according to a background update equation; and
    using said hue component and said saturation component to obtain an initial ambit of a moving obstacle.

3. The self-adaptive image-based obstacle detection method according to claim 2, wherein said obstacle recognition equation is expressed by $$R_{i,j}=P((H\_A_i-H\_A_j)^2+(S\_A_i-S\_A_j)^2)+(1-P)((H\_S_i-H\_S_j)^2+(S\_S_i-S\_S_j)^2)$$

wherein is a threshold value, P a parameter, $H\_A_i$ an average of an H value of said background block, $H\_S_i$ a standard deviation of said H value of said background block, $S\_A_i$ an average of an S value of said background block, $S\_S_i$ a standard deviation of said S value of said background block, $H\_A_j$ an average of an H value of said image block, $H\_S_j$ a standard deviation of said H value of said image block, $S\_A_j$ an average of an S value of said image block, and $S\_S_j$ a standard deviation of said S value of said image block.

4. The self-adaptive image-based obstacle detection method according to claim 2, wherein said moving obstacle recognition equation is expressed by $$a_n=\text{boolean}(\text{Norm}(P_n(u,v)-A_n(u,v))>\delta)$$

wherein $a_n$ is said moving obstacle region, $P_n$ a current image, $A_n$ a current background image, $\delta$ a threshold value, and n a serial number of an image.

5. The self-adaptive image-based obstacle detection method according to claim 2, wherein said brightness variation evaluation equation is expressed by $$N_{n+1}=\text{boolean}((\text{Norm}(P_n(u,v)-P_{n-1}(u,v))>\sigma)\cap(\text{Norm}(P_n(u,v)-P_{n-2}(u,v))>\sigma))$$

wherein $N_n$ is an area where brightness varies, $P_n$ a current image, $\delta$ a brightness threshold value, and n a serial number of an image.

6. The self-adaptive image-based obstacle detection method according to claim 2, wherein said background update equation is expressed by if $N_n(u,v)=0, A_{n+1}=\alpha A_n(u,v)+(1-\alpha)P_n(u,v)$ else $A_{n+1}(u,v)=A_n(u,v)$ wherein $N_n$ is an area where brightness varies, $P_n$ a current image, $A_n$ a current background image, n a serial number of an image, α a constant between 0 and 1.

7. The self-adaptive image-based obstacle detection method according to claim 2, which can be applied to a vehicular approaching-obstacle detection method after a position of an obstacle or a moving obstacle is obtained, wherein said vehicular approaching-obstacle detection method is applied to a vehicle and has a preset distance, and wherein a warning message is sent out if a distance between said vehicle and said obstacle, or a distance between said vehicle and said moving obstacle, is less than said preset distance.

8. The self-adaptive image-based obstacle detection method according to claim 2 further comprising a step of filtering out noise of said hue component and said saturation component.

9. The self-adaptive image-based obstacle detection method according to claim 1, wherein said obstacle recognition equation is expressed by $$R_{i,j}=P((H\_A_i-H\_A_j)^2+(S\_A_i-S\_A_j)^2)+(1-P)((H\_S_i-H\_S_j)^2+(S\_S_i-S\_S_j)^2)$$

wherein $R_{i,j}$ is a threshold value, P a parameter, $H\_A_i$ an average of an H value of said background block, $H\_S_i$ a standard deviation of said H value of said background block, $S\_A_i$ an average of an S value of said background block, $S\_S_i$ a standard deviation of said S value of said background block, $H\_A_j$ an average of an H value of said image block, $H\_S_j$ a standard deviation of said H value of said image block, $S\_A_j$ an average of an S value of said image block, and $S\_S_j$ a standard deviation of said S value of said image block.

10. The self-adaptive image-based obstacle detection method according to claim 1, wherein said HS-based image is divided into a plurality of said image blocks each containing N×N pixels.

11. The self-adaptive image-based obstacle detection method according to claim 1 further comprising a step of filtering out noise of said binary obstacle image after said binary obstacle image is formed.

* * * * *